June 2, 1931. W. A. CHRYST 1,807,772
ENGINE STARTING APPARATUS
Filed Aug. 13, 1927
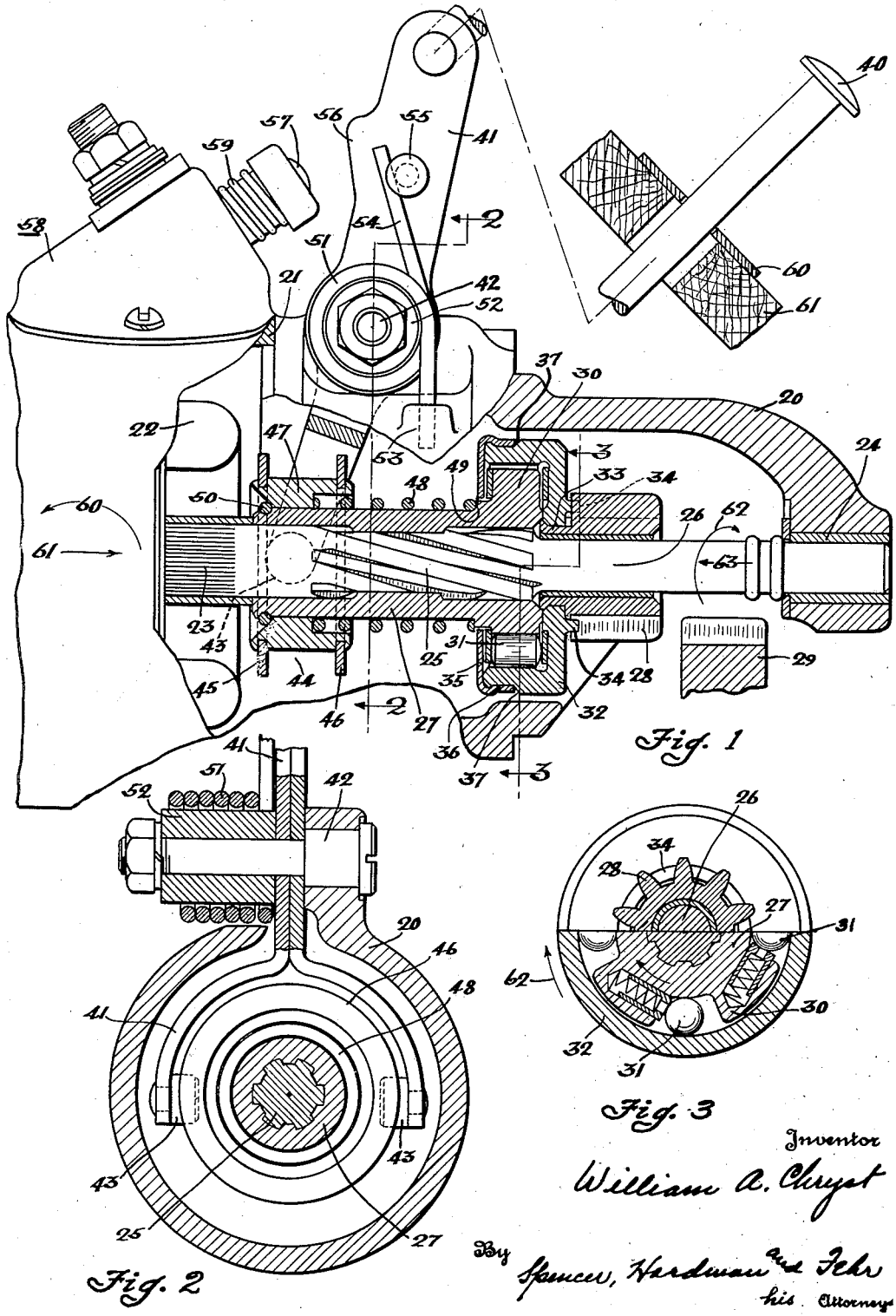
Inventor
William A. Chryst
By Spencer, Hardman and Fehr
his Attorneys Patented June 2, 1931

1,807,772

UNITED STATES PATENT OFFICE

WILLIAM A. CHRYST, OF DAYTON, OHIO, ASSIGNOR TO DELCO-REMY CORPORATION, OF DAYTON, OHIO, A CORPORATION OF DELAWARE

ENGINE STARTING APPARATUS

Application filed August 13, 1927. Serial No. 213,396.

This invention relates to an apparatus for starting internal combuston engines, and particularly to the type of apparatus which includes a pinion driven by an electric motor and movable into mesh with the gear of an engine to be started by a pedal operated device which is employed to close the motor switch.

One of the objects of the invention is to avoid damage to the gear teeth as much as possible in this type of apparatus.

Further objects and advantages of the present invention will be apparent from the following description, reference being had to the accompanying drawings wherein a preferred embodiment of one form of the present invention is clearly shown.

In the drawings:

Fig. 1 is a fragmentary side view, partly in section, of engine starting apparatus embodying the present invention.

Figs. 2 and 3 are sectional views taken respectively on the lines 2—2 and 3—3 of Fig. 1.

A gear housing 20 by which the starting apparatus is supported upon the frame of an engine not shown is used to support a motor field frame 21 which surrounds an armature 22 rotatable with the armature shaft 23 having one end supported by bearing 24 carried by the frame 20 and the other end supported by a part of the field frame not shown. The shaft 23 has a relatively long-lead helically splined portion 25 and a smooth portion 26 of lesser diameter than the outside diameter of the splined portion. The splined portion 25 is threadedly engaged by a sleeve 27 which drives through a one-way roller clutch a pinion 28 which is freely rotatable upon the smooth portion 26 of the shaft and which is movable endwise into engagement with the flywheel gear 29 of an engine to be started. The one-way roller clutch comprises a driving member or clutch cam 30 formed integrally with the sleeve 27 and cooperating with rollers 31 to drive a clutch shell 32 which is riveted to the hub 33 of the pinion 28 in order to provide a driving connection between the shell 32 and the pinion. The clutch shell 32 has an annular flange 34 coaxial with the shaft 26 and provided with notches each for receiving one of the teeth of the pinion 28 in order that the driving torque will be transmitted to the pinion partly through its hub and partly through the teeth. Separation of the clutch members is prevented by a disc 35 having a flange 36 which is spun into a groove 37 provided by the clutch shell 32.

The driving sleeve 27, the one-way clutch and the pinion are movable in assembled relation endwise along the shaft 23 by a pedal operated device including a pedal 40 connected with a lever 41 which is pivoted upon a stud 42 attached to the frame 20 and which is bifurcated at its lower end and carries studs or pins 43 which are received by the space 44 between collars 45 and 46 attached to a sleeve 47 which is movable endwise along the sleeve 27. Motion is transmitted from the sleeve 47 to the sleeve 27 through a spring 48 bearing at one end against the sleeve 47 and at the other end against a shoulder 49 provided by the sleeve 27. The spring 48 is maintained normally under compression by the sleeve 47 which is retained in position by split wire ring 50 received by a groove in the left end of the sleeve 27.

The lever 41 is maintained normally in the position shown in Fig. 1 by a spring 51 which is coiled around the hub 52 of the lever 41 and which has one end received by a socket 53 in the frame 20 and has the other end 54 bearing against a stud 55 attached to the lever 41. The lever 41 has a lug 56 which is adapted to engage a plunger 57 of a starting motor switch which is housed by a switch case 58. A spring 59 normally holds the plunger 57 in switch open position.

The pedal 40 is supported in any suitable manner for example, by a plate 60 attached to the floor board 61 of the automobile, the pedal passing through the plate and the floor board and being located in convenient reach of the driver.

To start the engine the operator presses the pedal 40 in order to move the pinion 28 into mesh with the engine gear 29 and to close the starting motor switch by pressing the switch plunger 57. When the engine becomes self-operative, the pinion 28 will be driven at a speed greater than it could be driven by the motor, therefore the pinion will overrun the motor due to the one-way clutch connection between the pinion and the motor. In case the ends of the pinion teeth collide with the ends of the gear teeth before meshing, a spring 48 permits closing of the motor switch in order to rotate the shaft 23 into such position that the teeth of the pinion will register with the tooth spaces of the gear 29. When the pinion teeth are located so as to mesh with the teeth of gear 29 the spring 48 will be released to move the pinion 28 quickly into mesh with the gear 29 so that these gears will be substantially engaged before the motor can attain its maximum speed.

The meshing of the gears is assisted by the operation of the motor which produces end thrust upon the pinion tending to urge it toward the gear due to the helical splined connection between the motor shaft 23 and the sleeve 27. The shaft 23 is driven by the motor in counter clockwise direction as indicated by the arrow 60 when the shaft is viewed in the direction of the arrow 61 or in a clockwise direction as indicated by the arrow 62 when the shaft is viewed in the direction of the arrow 63 in Figs. 1 and 3. At the instant the spring 48 is released to impart endwise motion to the clutch and pinion, the shaft 23 is turning in such direction as to produce end thrust upon the internal splines of the sleeve 27 such as to cause the sleeve and pinion to move toward the right into mesh with the engine gear. The instant the pinion 28 meshes with the engine gear 29, rotation of the pinion is resisted. Since the pinion is connected with the sleeve 27 by a one-way roller clutch, rotation of the sleeve is also resisted. Thus while the pinion 28 is sliding along the shaft 26 into complete mesh with the engine gear 29, the motor shaft 25 is tending to rotate ahead of or faster than the sleeve 27. Since relative rotation between the shaft 26 and sleeve 27 tends to take place, the shaft splines 25 tend to thrust the sleeve 27 toward the engine gear 29. In this way the assembly of sleeve 27, one-way clutch and pinion 28 is moved very quickly toward the right after the pinion has been turned by the motor for meshing registration with the gear. By providing for the rapid movement of the pinion relative to the gear, the pinion is meshed with the gear a substantial amount before the full speed of the motor is attained. Thus damage of the gear teeth due to impact is minimized.

After the engine has been started and the pedal 40 is released, the spring 54 will cause the lever 41 to move clockwise in order to retract the pinion from the gear.

The term "axially free, one-way clutch" is used in the claims to define a clutch which does not require its clutch member to be restrained from axial movement along the shaft in order that its clutch members may become engaged. The type of one-way clutch which is preferred in the present invention is one in which the clutch members become automatically connected due only to the tendency of the driving clutch member to rotate ahead of the driven member while the clutch members remain axially unrestrained. It is apparent that since the pinion is axially unrestrained while sliding from a partly meshed to a completely meshed position relative to the engine gear, the axially free type of one-way clutch is best suited since rotary movement of the sleeve will be resisted although the pinion and sleeve are free to move endwise. In this way the end thrust of the shaft splines upon the sleeve is rendered available to the fullest extent to move the pinion along the shaft.

While the form of embodiment of the present invention as herein disclosed, constitutes a preferred form, it is to be understood that other forms might be adopted, all coming within the scope of the claims which follow.

What is claimed is as follows:

1. Engine starting apparatus comprising in combination, an electric motor, a pinion movable endwise into mesh with the gear of an engine to be started, devices for connecting the pinion and motor including an axially free one-way clutch and a shaft having a helically splined portion and means for slidably connecting the pinion with the splined portion, the direction of the lead of the spline being so related to the direction of rotation of the shaft that operation of the motor will thrust the pinion endwise toward the gear, a motor switch, a manually operable device for operating the motor switch and for moving the pinion into mesh with the gear and including a spring for transmitting motion to the pinion in order to permit closing the motor switch in case the teeth of the pinion abut the engine gear teeth before meshing whereby the turning of the shaft by the motor will produce end-thrust upon the pinion to assist the spring in meshing the pinion rapidly with the gear.

2. Engine starting apparatus comprising in combination, an electric motor, a pinion movable endwise into mesh with the gear of an engine to be started, devices for connecting the pinion and motor including an axially free one-way clutch and driving connections for producing end thrust upon the pinion tending to urge the pinion toward the engine gear, a motor switch, a manually operable device for operating the motor switch and for moving the pinion into mesh with the gear and including a spring for transmitting motion to the pinion in order to permit closing the motor switch in case the teeth of the pinion abut the engine gear teeth before meshing whereby the motor may be operated to move the pinion into meshing registration with the gear and to thrust the pinion endwise in order to assist the spring in meshing the pinion rapidly with the gear.

3. Engine starting apparatus comprising, in combination, a motor, a shaft driven by the motor and having a helically splined portion of relatively long lead, a sleeve slidably connected with the splined portion, a pinion movable endwise into mesh with the gear of an engine to be started, an axially free one-way clutch for rotatably connecting the sleeve and pinion and adapted to transmit motion endwise between the sleeve and pinion, a motor switch, a manually operable device for operating the switch and for moving the pinion into mesh with the gear and including a spring for transmitting motion to the pinion in order to permit closing the motor switch in case the teeth of the pinion abut the engine gear teeth before meshing whereby the turning of the shaft by the motor will produce end thrust through the sleeve upon the pinion to assist the spring in meshing the pinion rapidly with the gear.

4. Engine starting apparatus comprising, in combination, an electric motor having its armature shaft provided with a long-lead helically splined portion and with a smooth portion, a sleeve slidably connected with the splined portion, a pinion slidable along the smooth portion into mesh with the gear of an engine to be started, an axially free one-way clutch having a driving portion provided by the sleeve and a driven portion attached to the pinion, means preventing endwise separation of the clutch portions, a motor switch, and manually operable means for operating the switch and for moving the sleeve, clutch and pinion endwise, said means including a spring for transmitting movement to the sleeve to permit closing the motor switch in case the pinion teeth abut the engine gear teeth before meshing, whereby the turning of the shaft by the motor will produce end-thrust upon the pinion to assist the spring in meshing the pinion rapidly with the gear.

5. Engine starting apparatus comprising in combination, a motor, a shaft operated by the motor and having a splined portion and a plain portion of reduced diameter, a pinion mounted for rotation upon the plain portion of the shaft and movable axially into mesh with the gear of an engine to be started, a sleeve surrounding the shaft and connected with the splines thereof and adapted to move the pinion into engagement with the engine gear, a one-way roller clutch connecting the sleeve and pinion and including a clutch cam connected with the sleeve and a clutch shell enclosing the cam and connected with the pinion, means for limiting endwise movement of the clutch cam relative to the clutch shell whereby movement of the sleeve away from the engine gear will move the pinion out of mesh with the engine gear, and means for moving the sleeve endwise along the shaft, said means including a shifting lever, a collar mounted upon the sleeve and cooperating with the lever, and a compression spring coiled around the sleeve and adapted to transmit motion from the collar to the sleeve in a direction for moving the pinion into mesh with the engine gear.

6. Engine starting apparatus comprising in combination, a motor; a shaft driven thereby; a unitary sub-assembly structure slidably mounted upon the shaft and comprising a sleeve drivingly connected with the shaft, a pinion adapted to mesh with the gear of an engine to be started, and a one-way roller clutch connecting the sleeve and pinion for imparting rotary motion from the sleeve to the pinion and for connecting the sleeve and pinion for axial movement together along the shaft; and means for moving said structure along the shaft and including a yielding motion transmitting connection.

7. Engine starting apparatus comprising, in combination, a motor; a shaft driven thereby and having a smooth portion and a splined portion; a unitary sub-assembly structure slidably mounted upon the shaft and comprising a sleeve surrounding the splined portion of the shaft and drivingly connected therewith, a pinion slidable upon the smooth portion of the shaft, and a one-way roller clutch connecting the sleeve and pinion and comprising a clutch cam provided by the sleeve and a clutch shell connected with the pinion and means for limiting relative axial movement between the cam and shell; and means for moving said structure along the shaft and including a yielding motion transmitting connection.

In testimony whereof I hereto affix my signature.

WILLIAM A. CHRYST.